United States Patent Office 2,779,259
Patented Jan. 29, 1957

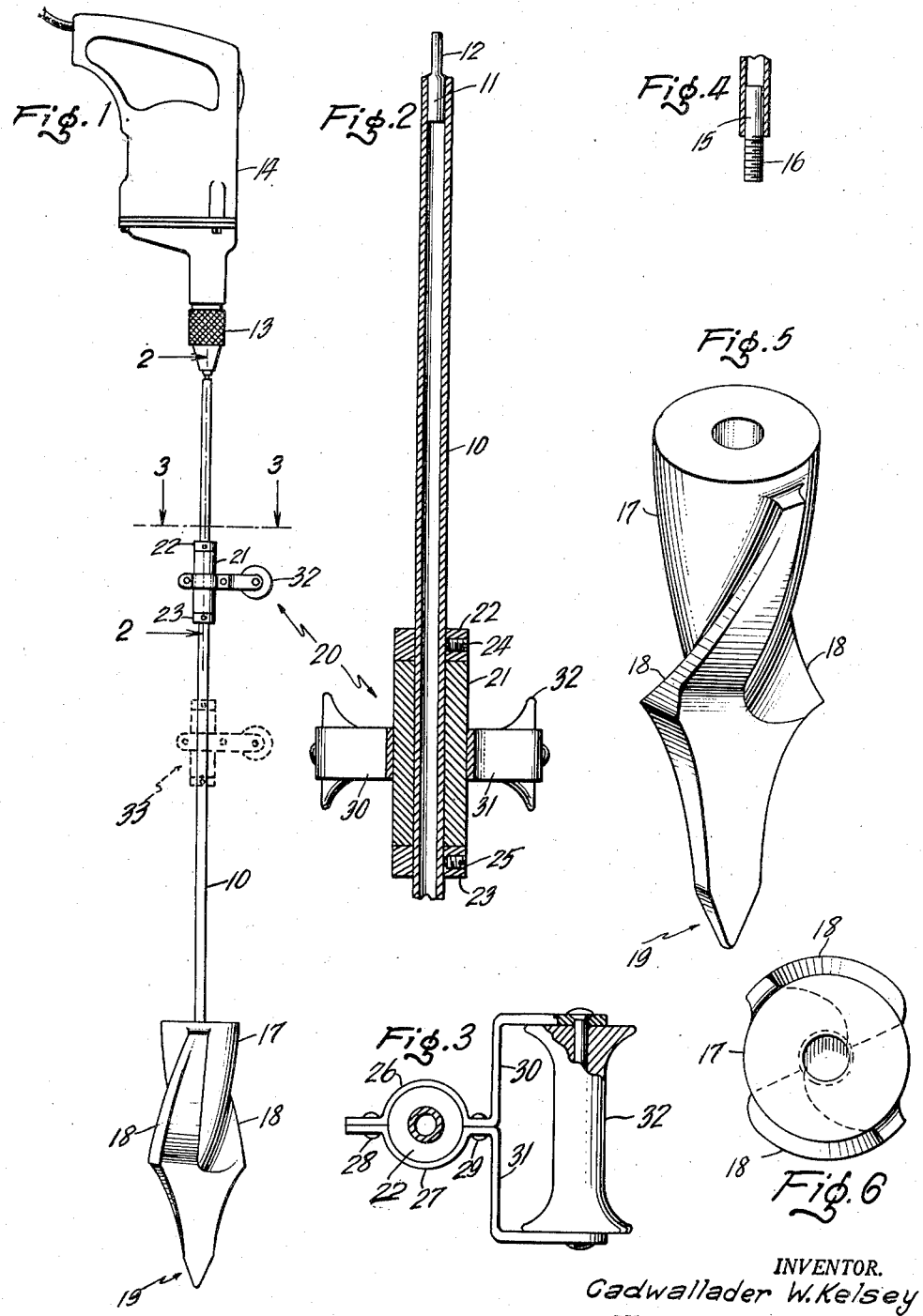

2,779,259

SOIL STIRRING DEVICE

Cadwallader W. Kelsey, Troy, N. Y.

Application February 12, 1954, Serial No. 409,836

7 Claims. (Cl. 97—43)

This invention has to do with a rotatable garden cultivating device for stirring and agitating the soil between closely growing plants, having particular reference to a novel type of soil stirring tool and rotatable connecting attachment for securing the same to a driving motor, and the provision of such a tool and attachment is a principal object of the invention.

Generally, it is an object of the invention to provide such a device that is particularly useful in small gardens, greenhouses, and the like, the same preferably being readily attachable to and useable with small conventional types of electric motors such as that herein disclosed, and which have, of recent years, become popular in many households.

More specifically, it is an object of the invention to provide such a device for a motor driving means constituting an elongated rotatable connecting member adapted to be secured at one end to such driving motor to rotate the same, and a rotatable ground stirring tool secured to the other end of such member, the tool having a body portion, soil stirring or agitating wings curved symmetrically and laterally from the longitudinal axis of the body portion and being rotatable only in a direction against the curvature of the wings to stir and churn the soil away from the body portion as the same penetrates the ground, which wings are tapered and flat from an intermediate point to terminate the tool in a pivot and centering point in order selectively to penetrate the ground at spaced intervals and to steady the tool during rapid rotation of the wings.

Another specific object of the invention is to provide in such a device an elongated rotatable tubular shaft, preferably of light weight metal, a stud secured in one end of the tubular shaft adapted firmly to be secured in the chuck of such a driving motor, another stud secured in the other end of the shaft and firmly to be secured to a ground stirring tool of the type herein disclosed, the shaft being provided with a hand-gripping bearing means mounted thereon so that the shaft is rotatable therein.

Another specific object of the invention is to provide in such a device a ground stirring tool, characterized by having a cone-shaped body portion, and soil agitating wings curved symmetrically from its longitudinal axis, the wings, together with the body portion, being generally S-shaped in cross-section, and adapted to rotate only in a direction against their curvature.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is an assembly view of the attachment embodied by the invention connected to a conventional small type of electric motor or drill;

Fig. 2 is a longitudinal sectional view, somewhat enlarged, taken along the lines 2—2 of Fig. 1, and looking in the direction of the arrows;

Fig. 3 is a transverse sectional view, somewhat enlarged, and with parts broken away, taken along the lines 3—3 of Fig. 1, and looking in the direction of the arrows;

Fig. 4 is a fragmentary portion of one end of the tubular shaft with a screw stud secured therein;

Fig. 5 is a perspective view of a preferred type of soil stirring or agitating tool embodied by the invention, illustrating approximately the actual size thereof; and Fig. 6 is a plan view of the tool shown in Fig. 5.

It should be understood at the outset that the device is not one which necessarily contemplates a drilling, plowing or boring action in the sense in which conventional drills are used. On the contrary, it is intended to provide a stirring, agitating or churning action to loosen and to aerate the soil around the base of closely growing plants which would otherwise be difficult to reach by hand with ordinary small garden tools, and to perform such operations in a quick and efficient manner with a stabbing or piercing type of action.

Referring now more particularly to the drawing, there is shown an elongated rotatable tubular shaft 10 of strong, lightweight material, preferably made of aircraft tubing. A stud 11 is firmly secured in one end of the tubular shaft 10 and is of reduced diameter where it projects therefrom, as indicated at 12 in order rapidly to be secured in a chuck 13 of a conventional type of electric motor or drill 14. In the other end of the tube is another stud 15 firmly secured therein, the same preferably being screw-threaded as at 16 to be secured to a suitable type of ground stirring tool such as that shown in Fig. 5.

The ground stirring tool has a paraboloidal body portion 17 as indicated in Fig. 5, and is characterized by having, for example, wings 18, with cutting edges, curved symmetrically and laterally from the longitudinal axis of said body portion. The wings when considered together with the body portion are of a configuration that is S-shaped in cross-section a substantial portion throughout and should only be rotated in a direction against their curvature and stirring edge.

The wings taper and flatten out from an intermediate point to a point where they begin to lose their S-shaped configuration and ultimately terminate in a pivot or centering point 19 in order selectively to penetrate the ground around the base of the plants at spaced intervals, and to steady the tool during operation. With this type of wing construction, rotating in the manner described, the desired stirring or churning action is obtained and without danger of scattering the soil, or snagging roots, small stones or other obstacles embedded therein. A further feature of such wing construction is that there is no appreciable danger of breakage of the parts or of overloading the motor.

In order further to provide a well-balanced, readily manipulatable stirring device of the kind described that can be handled with both hands by an operator, and to guide and steady the same during operation, a bearing means and hand-gripping member therefor are provided on the shaft 10 as indicated generally at 20. Preferably this comprises a sleeve-bearing 21 in which the shaft 10 is rotatable. At each end of the bearing are collets 22 and 23 which are secured to, and are rotatable with, the shaft 10 by means of set screws 24 and 25. Clamping means, in the form of two strips of metal 26 and 27, are secured to the sleeve 21 by means of rivets 28 and 29. The strips extend laterally therefrom and are bifurcated as at 30 and 31 to carry a gripping handle 32 mounted therebetween.

With this gripping arrangement the device will be well-balanced in the operator's hands, and the same can be shifted to any intermediate position along the tubular shaft as generally indicated in the dotted line position of Fig. 1 as at 33.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a rotatable garden cultivating device for stirring soil between closely growing plants by a manual stabbing and piercing action, comprising in combination an elongated rigid rotatable connecting member adapted removably to be mounted at one end to an electric hand drill to rotate the same; and a rotatable ground stirring tool removably secured to the other end of said member; said tool having a body portion, soil stirring wings curved symmetrically and laterally rearwardly from the longitudinal axis of said body portion, away from their direction of rotation, and being rotatable in a direction against the curvature of said wings to stir the soil away from said body portion as the same penetrates the ground, which wings are tapered upwardly from an outermost intermediate point throughout their curved portions to terminate adjacent the top of said body, and tapered downwardly from the same point to blend into a single flat wing terminating said tool in a pivot and centering point, whereby selectively to penetrate said ground at spaced intervals and to steady said tool during operation of said soil stirring wings.

2. In a rotatable garden cultivating device for stirring soil between closely growing plants by a manual stabbing and piercing action, comprising in combination an elongated rigid rotatable shaft; means at one end of said shaft removably to mount the same to the chuck of an electric hand drill; means at the other end of said shaft removably to mount a rotatable ground stirring tool; and a rotatable ground stirring tool secured to said last named means; said tool having a body portion, soil stirring wings curved symmetrically and laterally rearwardly from the longitudinal axis of said body portion, away from their direction of rotation, and being rotatable in a direction against the curvature of said wings to stir the soil away from said body portion as the same penetrates the ground, which wings are tapered upwardly from an outermost intermediate point throughout their curved portions to terminate adajacent the top of said body, and tapered downwardly from the same point to blend into a single flat wing terminating said tool in a pivot and centering point, whereby selectively to penetrate said ground at spaced intervals and to steady said tool during operation of said soil stirring wings.

3. In a rotatable garden cultivating device for stirring soil between closely growing plants by a manual stabbing and piercing action, comprising in combination an elongated rotatable tubular shaft of light weight material; a stud secured in one end of said tubular shaft and removably to be secured in the chuck of an electric hand drill; a second stud secured in the other end of said tubular shaft removably to mount a ground stirring tool; and a rotatable ground stirring tool secured to said last named stud; said tool having a body portion, soil stirring wings curved symmetrically and laterally rearwardly from the longitudinal axis of said body portion, away from their direction of rotation, and being rotatable in a direction against the curvature of said wings to stir the soil away from said body portion as the same penetrates the ground, which wings are tapered upwardly from an outermost intermediate point throughout their curved portions to terminate adjacent the top of said body, and tapered downwardly from the same point to blend into a single flat wing terminating said tool in a pivot and centering point, whereby selectively to penetrate said ground at spaced intervals and to steady said tool during operaiton of said soil stirring wings.

4. In a rotatable garden cultivating device for stirring soil between closely growing plants by a manual stabbing and piercing action, comprising in combination an elongated rigid rotatable connecting member adapted removably to be mounted at one end to an electric hand drill to rotate the same; and a rotatable ground stirring tool secured to the other end of said member; said tool having a body portion, soil stirring wings curved symmetrically and laterally rearwardly from the longitudinal axis of said body portion, away from their direction of rotation, and being rotatable in a direction against the curvature of said wings to stir the soil away from said body portion as the same penetrates the ground, which wings are tapered upwardly from an outermost intermediate point throughout their curved portions to terminate adjacent the top of said body, and tapered downwardly from the same point to blend into a single flat wing terminating said tool in a pivot and centering point; and hand-gripping bearing means slidably mounted on said rotatable member intermediate its ends, whereby selectively to penetrate said ground at spaced intervals and to steady said tool during operation of said soil stirring wings.

5. In a rotatable garden cultivating device for stirring soil between closely growing plants by a manual stabbing and piercing action, comprising in combination an elongated rotatable rigid connecting member adapted removably to be mounted at one end to an electric hand drill to rotate the same; and a rotatable ground stirring tool secured to the other end of said member; said tool having a body portion, soil stirring wings curved symmetrically and laterally rearwardly from the longitudinal axis of said body portion, away from their direction of rotation, and being rotatable in a direction against the curvature of said wings to stir soil away from said body portion as the same penetrates the ground, which wings are tapered upwardly from an outermost intermediate point throughout their curved surfaces, to terminate adjacent the top of said body, and tapered downwardly from the same point to blend into a single flat wing terminating said tool in a pivot and centering point; and means, including a sleeve bearing slidably mounted intermediate the end of said rotatable member, a hand-grip member attached to said sleeve, and retaining members at opposite ends of said sleeve, secured to said rotatable member to rotate therewith as said member rotates within said sleeve, whereby selectively to penetrate said ground at spaced intervals and to steady said tool during operation of said soil stirring wings.

6. A rotatable garden cultivating device for stirring soil between closely growing plants by a manual stabbing or piercing action, comprising in combination an elongated rigid rotatable driving shaft; an electric hand drill, having a chuck, removably mounting one end of said shaft to rotate the same; and a rotatable ground stirring tool removably mounted on the other end of said shaft; said tool having a body portion, soil stirring wings curved symmetrically and laterally rearwardly from the longitudinal axis of said body portion, away from their direction of rotation, and being rotatable in a direction against the curvature of said wings to stir the soil away from said body portion as the same penetrates the ground, which wings are tapered upwardly from an outermost intermediate point throughout their curved portions, to terminate adjacent the top of said body, and tapered downwardly from the same point to blend into a single flat wing terminating said tool in a pivot and centering point, whereby selectively to penetrate said ground at spaced intervals and to steady said tool during operation of said soil stirring wings.

7. In a rotatable garden cultivating device for stirring soil between closely growing plants by a manual stabbing and piercing action, comprising a ground stirring tool characterized by having a paraboloidal body portion and wings curved symmetrically and laterally rearwardly from the longitudinal axis of said body portion away from their direction of rotation, which wings, together with said body portion, in configuration are S-shaped in cross-section, and adapted to rotate only in a direction against their curvature to stir soil away from said body portion, said wings being tapered upwardly from an outermost intermediate point throughout their curved surfaces and terminating adjacent the top of said body, and tapered downwardly from the same point to blend into a single flat wing terminating in a pivot and ground penetrating and centering point.

References Cited in the file of this patent

UNITED STATES PATENTS

| | | |
|---|---|---|
| 1,660,764 | Pidlisny | Feb. 28, 1928 |
| 1,949,591 | Vaughn | Mar. 6, 1934 |
| 2,062,820 | Pierce | Dec. 1, 1936 |
| 2,101,394 | Johnson | Dec. 7, 1937 |
| 2,458,200 | Renfroe et al. | Jan. 4, 1949 |
| 2,574,237 | Barrow | Nov. 6, 1951 |
| 2,625,867 | Hands | Jan. 20, 1953 |
| 2,699,605 | Setter | Jan. 18, 1955 |

FOREIGN PATENTS

| | | |
|---|---|---|
| 551,160 | Germany | May 28, 1932 |